United States Patent [19]

Sulc et al.

[11] Patent Number: 5,807,917
[45] Date of Patent: Sep. 15, 1998

[54] COMPOSITE PRESSURE SENSITIVE HYDROPHILIC ADHESIVE AND METHOD OF PREPARING THE SAME

[76] Inventors: Jiri Sulc, Na Pekne vylidce 4, 150 00 Prague 6; Zuzane Krcova, Belohoreka 90, 160 00 Prague 6, both of Czechoslovakia

[21] Appl. No.: 732,477

[22] PCT Filed: May 10, 1995

[86] PCT No.: PCT/CZ95/00007

§ 371 Date: Nov. 8, 1996

§ 102(e) Date: Nov. 8, 1996

[87] PCT Pub. No.: WO95/31514

PCT Pub. Date: Nov. 23, 1995

[30] Foreign Application Priority Data

May 11, 1995 [CS] Czechoslovakia ............... 1165-94

[51] Int. Cl.$^6$ .................. C08K 5/06; A61L 15/00
[52] U.S. Cl. .................. 524/377; 524/379; 524/386; 524/513; 524/524; 524/526; 523/111; 424/DIG. 7
[58] Field of Search ................... 524/377, 379, 524/386, 513, 524, 526; 523/111; 424/DIG. 7

[56] References Cited

U.S. PATENT DOCUMENTS 4,303,066  12/1981  D'Andrea ............... 424/DIG. 7
5,064,652  11/1991  Bay ............................ 424/445

*Primary Examiner*—Vasu Jagannathan
*Assistant Examiner*—Olga Asinovsky
*Attorney, Agent, or Firm*—Notaro & Michalos P.C.

[57] ABSTRACT

A composite pressure-sensitive hydrophilic adhesive such as for holding a medical or cosmetic treatment against the skin of a person is composed of a crosslinked polymer and a non-crosslinked polymer and a polar water-miscible solvent having a boiling point above 100° C. at atmospheric pressure. The adhesive has little or no cold flow and can be applied in sheets. An alternate combination of polymers and a method of making both compositions is also disclosed.

5 Claims, No Drawings

COMPOSITE PRESSURE SENSITIVE HYDROPHILIC ADHESIVE AND METHOD OF PREPARING THE SAME

TECHNICAL FIELD

The invention relates to a composite pressure sensitive adhesive particularly suitable for temporarily glueing medical and cosmetic means to the body surface from which it can be easily removed by liquid water or by innocuous diluted aqueous solutions.

BACKGROUND ART

There are known non-tacky hydrogel covers of burnt or wounded skin, consisting of a gelled mixture of water-insoluble, water swellable polymers such as poly(2-hydroxyethyl methacrylate), which can be either covalently crosslinked (three-dimensional) or solvent soluble noncrosslinked, with a polar high boiling solvent such as polyethylene glycol, preferably mixed with water either by sprinkling the liquid component onto skin and then powdering it with the ground dried polymer, or by mixing the two components just before the spreading. The mixture sets after a short time of up to about 50 minutes, forming a non-tacky layer which can be peeled off as such or after further wetting. (See U.S. Pat. Nos. 4,272,518 and 4,303,066). A combination of a crosslinked polymer with a polymer soluble in the above mentioned plasticizer is not disclosed. U.S. Pat. No. 4,460,562 discloses a polymeric diffusion matrix containing a drug (propanol) and consisting of from about 1% to about 60%, of polar highly boiling plasticizer such as glycerol, from about 2% to about 30% of poly(N-vinylpyrrolidone) and from about 6% to about 30% of at least 90% hydrolyzed poly(vinylacetate) together with a transdermally effective amount of propanol. These compositions, as discussed in the Examples, possess an inferior to the skin and insufficient elongation. Moreover, they display a tendency to the syneresis.

None of the above mentioned references relates to a pressure sensitive adhesive which could be utilized as such. All of them disclose mixtures of either crosslinked or non-crosslinked hydrophilic polymers—but no combination thereof—with polar high boiling point (plasticizers) and a minor amount of water, said mixtures setting on the skin so that they adhere to it. They cannot be used as adhesives for glueing medical means temporarily to the skin.

U.S. Pat. No. 4,595,053 describes hydrophilic pressure sensitive biomedical adhesives, comprising about from 27% to 50% of poly(N-vinylpyrrolidone), from about 2% to 5% of polyvinylalcohol, from 5% to about 40% of a polar plasticiser and about 5% to 50% of water. In this case all components are water-soluble and the mixture has to be heated in the presence of water to at least 95° C. to form a melt capable to get gelled only upon cooling. The preparation requires a temperature-controlled stirrable reactor and temperatures up to 130° C. No crosslinked or insoluble polymer is added. The mixture is set by cooling, not by heating.

Other pressure sensitive biomedical adhesives such as those described in the European Patent Specifications No EP 0092999 A2 and EP 0 130 061 A1 contain hydrophobic components such as synthetic rubber and mineral oil besides water-soluble gums, resins and tackifiers. They differ therefore distinctly from the present ones as defined below.

Disclosure of Invention

The object of the present invention is to provide a composite pressure sensitive hydrophilic adhesive, permeable for water vapor and which loses its adhesivness in contact with liquid water, that is particularly suitable for temporarily glueing medical means to the body surface, consisting of the gelled mixture of (a) a water swellable, water insoluble polymer, soluble in polar water-miscible solvents, boiling at atmospheric pressure at temperatures higher than 100° C. as well as in their mixtures with minor amounts of water, a (b) hydrophilic water swellable polymer, insoluble in water as well as in polar water-miscible solvents boiling at atmospheric pressure at temperatures higher than 100° C. and (c) a polar water-miscible innocuous solvent, boiling at atmospheric pressure at temperatures higher than 100° C., and which, if desired, can be mixed with a minor amount of water.

Another object of the invention is to provide a composite pressure sensitive hydrophilic adhesive, permeable for water vapor, and losing its adhesivness in contact with liquid water, particularly suitable for temporarily glueing medical means to the body surface, wherein the separate polymers (a) and (b) are replaced by a non-crosslinked copolymer of hydrophilic and hydrophobic monomers, only partially soluble in the component (c) but swellable therein.

The invention furthermore comprises a method of preparing the composite pressure sensitive hydrophilic adhesive according to the invention consisting in the short-time intensive stirring of the dry pulverized polymers (a) being the water swellable, water insoluble polymer, soluble in polar water miscible solvents boiling at atmospheric pressure at temperatures higher than 100° C. as well as in their mixtures with minor amounts of water and (b) being the hydrophilic water swellable polymer, insoluble in water as well as in polar water-miscible solvents boiling at atmospheric pressure at temperatures higher than 100° C., in the solvent (c) being a polar water-miscible innocuous solvent boiling at atmospheric pressure at temperatures higher than 100° C., if desired mixed with a minor amount of water, spreading the paste thus obtained on a pad, and setting it to a gelled layer.

The stirring of the components according to the method of the invention is carried out preferably at a temperature not exceeding 15° C. and the setting of the stirred mixture is carried out at temperatures in the range of from about 15° to 100° C.

The inventive composite pressure sensitive hydrophilic adhesive according to the invention can be used in such a way that the mixing of components is advantageously carried out at temperatures not exceeding 15° C. and the thus recieved mass is afterwards spread to the surface of the medical means to be glued to the body surface, and subseqently the spread layer is left to set at temperatures in the range of from 15° C. to about 100° C. either by prolonged storage at room temperature or by heating.

As polymer (a) water swellable, water insoluble polymer, soluble in polar water-miscible solvents boiling at atmospheric pressure at temperatures higher than 100° C. as well as in their mixtures with minor amounts of water, there are used noncross-linked polymers either linear or branched, whereas as polymer (b), the hydrophilic water swellable polymer, insoluble in water as well as in polar water-miscible solvents, there is used a covalently crosslinked polymer which is thus insoluble in any liquid and swellable but in water and water-miscible liquids and their mixtures.

The expression "medical means" comprises devices and means utilizable externally in medicine, e.g. pouches with drug for transdermal application, contact with various medical measuring apparatuses, special dressing, stopper-like means for restraining urinary incontinence device etc.

The expression "polymer" includes both homo- and copolymers with purely carbonaceous or hetero-atoms containing main chain.

Most common examples of water-miscible, polar high-boiling innocuos liquids are glycerol and its partial esters such as glycerol mono- and diacetate, alkylene glycols such as ethylene and propylene glycols, dimethylsulfoxide.

The solubility of the polymers (a) in polar, water-miscible solvents is caused by the presence of hydrophilic side substituents or also of oxygen atoms in the main chain. The insolubility of the polymers (b) is due usually to covalent crosslinking, in some cases also to the presence of hydrophobic comonomer units, although covalently crosslinked polymers such as poly(2-hydroxyethyl methacrylate) crosslinked by a small amount (up to about 2%) of ethyleneglycol dimethacrylate, or methacrylamide copolymerized with a similar amount of ethylene-bis-methacrylamide are prefered.

As water swellable polymers (b), insoluble in water as well as in polar water miscible, high boiling solvents defined sub (c) and in their mixtures with water e.g. following ones can be used. Copolymers of minor amount of hydrophobic monomers such as methylmethacrylate, butylacrylate and methacrylate, or vinylacetate, with a major amount of essentially nonionizable hydrophilic monomers, the hydrophility of which is caused by the content of free hydroxylic or other non-substituted or mono- or disubstituted amide groups, lactone, lactame, pyrrolidone etc., provided of course that such copolymers are innocuos. If desired, the copolymer of this kind, belonging to the sort defined sub (b), can contain a small amount of units ionizable in water such as those acrylic, methacrylic or vinyl sulfonic acid in form of their sodium salts.

The adhesives of the invention can be prepared by grinding from about 0.2 parts to about 75 parts of dry polymer (a), a water swellable, water insoluble polymer, soluble in polar water-miscible solvents, boiling at atmospheric pressure at temperatures higher than 100° C. as well as in their mixtures with minor amounts of water, with from about 2 to about 75 parts of dry polymer (b), a hydrophilic water swellable polymer, insoluble in water as well as in polar water-miscible solvents boiling at atmospheric pressure at temperatures higher than 100° C. to a fine powder which is rapidly stirred into from about 15 parts to about 90 parts of liquid (c), a polar water-miscible innocuous solvent, boiling at atmospheric pressure at temperatures higher than 100° C., if desired mixed with a minor amount of water, which has been preferably cooled under +5° C. The intensive stirring lasts but several minutes and the mash thus obtained is spread onto a pad or a release sheet or foil such as siliconized or parafinized paper or Mylar foil. Thanks to the content of the insoluble, but swellable polymer (b) the not yet gelled mixture displays no tendency to cool flow and easily forms a uniform layer which is then set either by prolonged storage at room temperature or, better, by heating up to about 100° C. The gelled layer does not flow even at increased temperatures.

The mixture of non-crosslinked and crosslinked polymers can be prepared either separately in two different batches, or also in one batch by first carrying out linear (or branched) polymerization and, prior to its end when the batch still contains the monomer and initiator and is still easily stirrable, by adding a suitable soluble crosslinking agent.

The ratio of the components (a) and (b) is chosen so as to obtain the required tackiness and elongation of the set or gelled adhesive. Said properties can be influenced in a known way by the ratio of high and low molecular weight of the polymer.

When using poly(2-hydroxyethyl methacrylate) (polyHEMA) no separate crosslinking agent has to be added since the bifunctional monomer contains always a small but sufficient amount of the tetrafunctional ethyleneglycol dimethacrylate.

The main advantage of the present adhesive lies in the absence of plastic cool flow due to the content of the polymer (b), a hydrophilic water swellable polymer, insoluble in water as well as in polar water-miscible solvents boiling at atmospheric pressure at temperatures higher than 100° C., particularly when the same is partly or sparingly crosslinked and/or but partially swellable in the component (c) a polar water-miscible innocuous solvent, boiling at atmospheric pressure at temperatures higher than 100° C., if desired mixed with a minor amount of water as well as in water. Furthermore, the present adhesive is easily permeable for water vapors so that the skin does not sweat below it, provided that the medical means glued by it is also water vapor permeable.

The adhesive of the invention has good affinity to hydrophilic surfaces, e.g. to medical means to be adhered to the skin made from hydrophilic materials such as hydrophilic polyurethanes, to many metals, china etc. Adhesion to the otherwise hydrophobic polymers such as porous (micro- or macroporous) polyolefines can be achieved by chemical sulfonation or oxidation by means of silent discharge and neutralization. Other examples of materials compatible with the present adhesive are various hydrogels and their composites such as polysiloxane/polyHEMA and others.

Obviously, mixtures of two or more polar water miscible solvents can be used without exceeding the scope of the invention. The expression minor amount means less than 50%. Used abbreviation polyHEMA=poly(2-hydroxyethyl methacrylate).

EXAMPLES

Example 1

14.7 g of non-crosslinked poly(2-hydroxyethyl methacrylate) (polyHEMA) (mol. weight average $1.5 \times 10$ ) are finely ground with 6.3 g of dry poly(2-hydroxyethylmethacrylate), crosslinked with 0.8% ethyleneglycol dimethacrylate. The powdered mixture of the two polymers is added to 39 g of polyethyleneglycol (PEG 400) while stirring intensively at 7° C. for two minutes. Then the paste is spread onto a pad of hydrophilic polyurethane and heated 20 minutes to 75° C. The gelled adhesive layer is provided with a release sheet of siliconized paper and packed.

Example 2

Dry powdered mixture of 22 g ethoxyethyl methacrylate polymer with 5g poly(2-hydroxyethyl methacrylate) crosslinked with 0.8 g ethyleneglycol dimethacrylate is stirred at 15° C. intensively for two minutes in 31 g of polypropyleneglycol (PPG 400) The thin paste thus obtained is spread onto a foil of porous hydrophilic polyurethane and heated 30 minutes to 80° C. The layer has high adhesivity to the skin and the whole can be easily removed by rinsing with water.

Example 3

20 g of hydroxypropyl cellulose with 15% of the original hydroxylic groups left free is dryed, ground and mixed with a mixture of polyethylene glycol PEG 500/water (ratio 6:4). Then the mixture is heated to 80° C. until a major part of the polymer is dissolved. The mash-like mixture is then extruded at 90° C. onto a textile pad forming upon cooling a pressure sensitive dressing.

Example 4

30 g of the dry powdered copolymer of methyl methacrylate, hydroxyethyl methacrylate and methacrylic acid, ratio of the units 20:19:1, with an average molecular weight about $2\times10^5$, are stirred intensively for 3 minutes into 45 g of a mixture of polyethylene glycol PEG 400 with propylene glycol in a ratio of 80:20. The paste is spread in an about 1 mm thick layer onto a foil of hydrophilic polyurethane and left 24 hours at room temperature. The adhesive layer loses its adhesiveness if brought in contact with a surplus of water.

We claim:

1. A method of preparing a composite-pressure sensitive hydrophilic adhesive permeable to water vapor and which loses its adhesiveness when placed in contact with water in liquid form that is particularly suited for temporarily gluing medical means to the surface of a person's body, the method comprising:

providing a water-swellable, water-insoluble polymer in a dry powder form, the water-insoluble polymer being soluble in polar water-miscible solvents having boiling points at atmospheric pressure at temperatures higher than 100° C., the boiling points still being above 100° C. when mixed with minor amounts of water;

providing a hydrophilic water-swellable polymer in a dry powder form, the hydrophilic polymer being insoluble in water and insoluble in polar water-miscible solvents having boiling points at atmospheric pressure above 100° C.; and providing a polar water-miscible innocuous solvent having a boiling point at atmospheric pressure above 100° C.

rapidly mixing the water-insoluble polymer, the hydrophilic polymer and the innocuous solvent to form a paste;

spreading the paste on a pad; and setting the paste to a gelled layer.

2. A method according to claim 1, wherein the mixing is done at a temperature of between 5° C. and 15° C.

3. A method according to claim 2, wherein the setting is done at a temperature of between 15° C. and 100° C.

4. A method according to claim 2, wherein the setting is done by heating.

5. A method according to claim 2, wherein the setting is done by leaving the paste at room temperature.

\* \* \* \* \*